United States Patent
Bank et al.

(10) Patent No.: US 9,538,335 B1
(45) Date of Patent: Jan. 3, 2017

(54) INFERRING DEVICE THEFT BASED ON HISTORICAL LOCATION DATA

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/805,714

(22) Filed: Jul. 22, 2015

(51) Int. Cl.
*H04W 4/00* (2009.01)
*H04W 4/02* (2009.01)
*H04W 12/12* (2009.01)

(52) U.S. Cl.
CPC ............. *H04W 4/028* (2013.01); *H04W 12/12* (2013.01)

(58) Field of Classification Search
CPC .............................. H04W 4/028; H04W 12/12
See application file for complete search history.

(56) References Cited

U.S. PATENT DOCUMENTS

| | | | |
|---|---|---|---|
| 6,556,819 B2 | 4/2003 | Irvin | |
| 8,248,237 B2 | 8/2012 | Fitzgerald et al. | |
| 8,911,507 B1 | 12/2014 | Gilbert et al. | |
| 2011/0057797 A1* | 3/2011 | Parker | G08B 21/22 340/568.1 |
| 2014/0179270 A1 | 6/2014 | Anand | |
| 2015/0113632 A1 | 4/2015 | Saito et al. | |

FOREIGN PATENT DOCUMENTS

WO 2014027242 A1 2/2014

OTHER PUBLICATIONS

Buthpitiya et al, "n-gram Geo-Trace Modeling", Proceedings of the 9th International Conference on Pervasive Computing, Pervasive Computing, Lecture Notes in Computer Science, v.6696, 2011, pp. 97-114.
Graham-Rowe, Duncan, "Phone Friend", New Scientist, Jan. 31, 2001, 1 page.
Ludka, Alexandra, "iPhone Thefts: 'Apple Picking' on the Rise", World News, Sep. 14, 2012, 7 pages, <http://abcnews.go.com/blogs/technology/2012/09/iphone-thefts-apple-picking-on-the-rise/>.

(Continued)

*Primary Examiner* — Chuong A Ngo
(74) *Attorney, Agent, or Firm* — David B. Woycechowsky

(57) ABSTRACT

A set of mobile devices are designated as a related set of mobile devices for loss indication purposes. Machine logic rules are developed to indicate loss of a mobile device. Under these rules, a determination of probable loss (for example, theft, inadvertent leaving behind) of one of the mobile devices depends, at least in part, upon the activities and/or status of other mobile devices in the set. For example, if a first mobile device in the set is expected, under the machine logic rules, to always be near a second mobile device in the set, then a determination that the second mobile device is located far away from the first mobile device may trigger a warning, or other mitigating action, that the first mobile device has probably been lost.

18 Claims, 2 Drawing Sheets

(56) References Cited

OTHER PUBLICATIONS

Rose, Joseph, "'Apple picking' is latest crime trend on TriMet buses and trains", updated Apr. 29, 2013 at 10:49 pm, <http://www.oregonlive.com/commuting/index.ssf/2013/04/apple_picking_is_latest_crime.html>, 18 pages.
Zincir et al., "Behavioural Profiling in Wireless Networks", Proceedings of the 5th Annual Postgraduate Conference PGNET 2004, Jun. 28-29, Liverpool, UK, pp. 128-133, 2004.
"App that locks phone based on location", Androidforums, Feb. 11, 2013, 5 pages, <http://androidforums.com/threads/app-that-locks-phone-based-on-location.687175/>.
"Method and system for mobile devices robbery prevention", An IP.com Prior Art Database Technical Disclosure, Authors et. al.: Disclosed Anonymously, IP.com No. 000223094, IP.com Electronic Publication: Nov. 2, 2012, 2 pages.

\* cited by examiner

INFERRING DEVICE THEFT BASED ON HISTORICAL LOCATION DATA

BACKGROUND

The present invention relates generally to the field of mobile electronic device security, and more particularly to automatic detection of lost or stolen status of a mobile electronic device and automatic responses thereto.

Mobile devices, such as smartphones, table computers, etc., are subject to being lost or stolen. Mobile devices are attractive targets for potential thieves, particularly in crowded locations such as mass transit trains, busses and stations. Some users become unwitting targets for mobile device theft when they appear to be unlikely to resist an attempted theft of their device. Worse, the potential victim's attention is often focused more on the mobile device and less on their surroundings. A thief, after identifying a potential victim, waits for an opportune moment to snatch the mobile device and then quickly escape the vicinity before the victim can respond. Apart from the loss of a mobile device itself, the device often contains personal data that may be leveraged in various ways by an unauthorized user, to the detriment of the owner and/or the owner's personal contacts.

U.S. Pat. No. 8,911,507 ("Gilbert") discloses as follows: " . . . systems and methods for mitigating mobile device loss by using historical data describing past locations of a mobile device to determine where the mobile device is expected to be and by automatically taking security measures if the mobile device is in an unexpected location . . . "

SUMMARY

According to an aspect of the present invention, there is a method, computer program product and/or system that performs the following operations (not necessarily in the following order): (i) designating a plurality of mobile devices, including a first mobile device and a second mobile device, as a related set of mobile devices for loss indication purposes; and (ii) making a machine logic based first related device loss rule including a first triggering condition(s) and a first consequence, with: (a) the first triggering condition being based, at least in part, upon activities and/or status of the second mobile device, and (b) the first consequence being activation of a first loss indication indicating that loss of the first mobile device is at least marginally more likely than it is absent the first loss indication of the first consequence.

DETAILED DESCRIPTION

Figure 1:
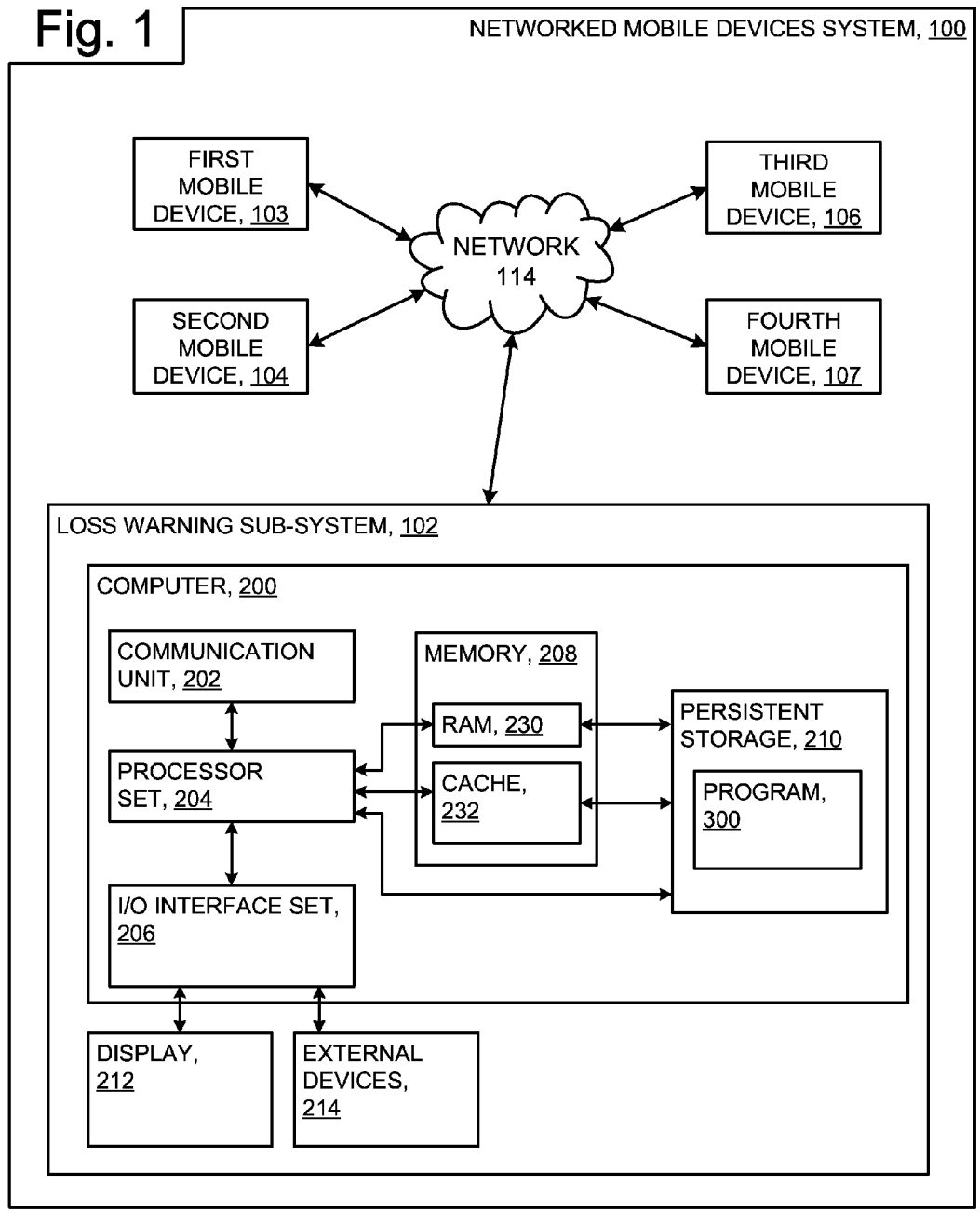
FIG. 1 is a block diagram view of a first embodiment of a system according to the present invention.

Many users own more than one mobile device (such as a smart phone or tablet computer), and/or have a family plan where multiple mobile devices are shared among the plan members. Some embodiments of the present invention gather location data pertaining to the multiple mobile devices. Based on the data gathered, the devices develop normal patterns of their movements, and continue to monitor their locations and movements. In the event that one of the devices determines its current location and/or movements do not fit into normal patterns, the device automatically applies enhanced security measures designed to validate a current user as an owner. Should the current user fail to pass the validation, the device enters into a "lost" status wherein it becomes non-functional and/or takes measures designed to assist in its recovery by the owner and/or to identify the current user.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked mobile devices system 100, including: loss warning sub-system 102 (or, simply, sub-system 102); first mobile device 103 (also known as sub-system 103); second mobile device 104; third mobile device 106; fourth mobile device 107; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300. Mobile devices 103, 104, 106 and 107 are sometimes collectively referred to as a mobile device set.

Loss warning sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with various sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
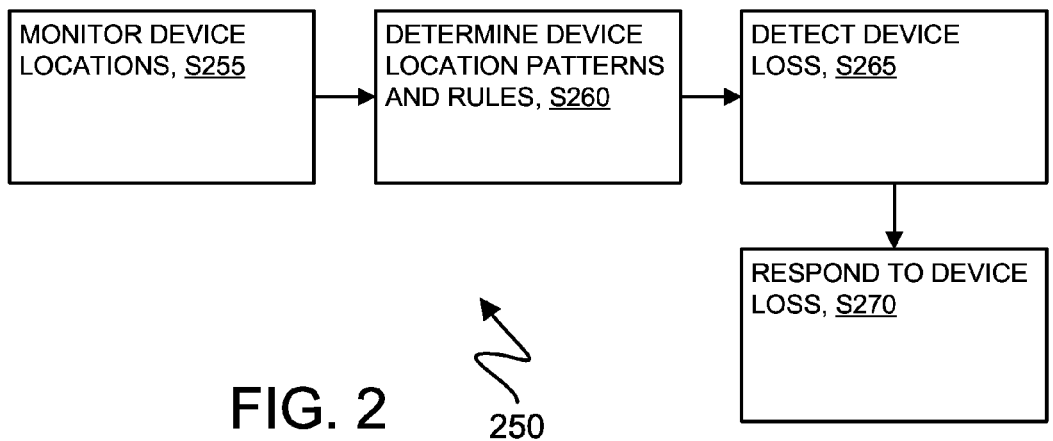
FIG. 2 is a flowchart showing a first embodiment method performed, at least in part, by the first embodiment system.
Figure 3:
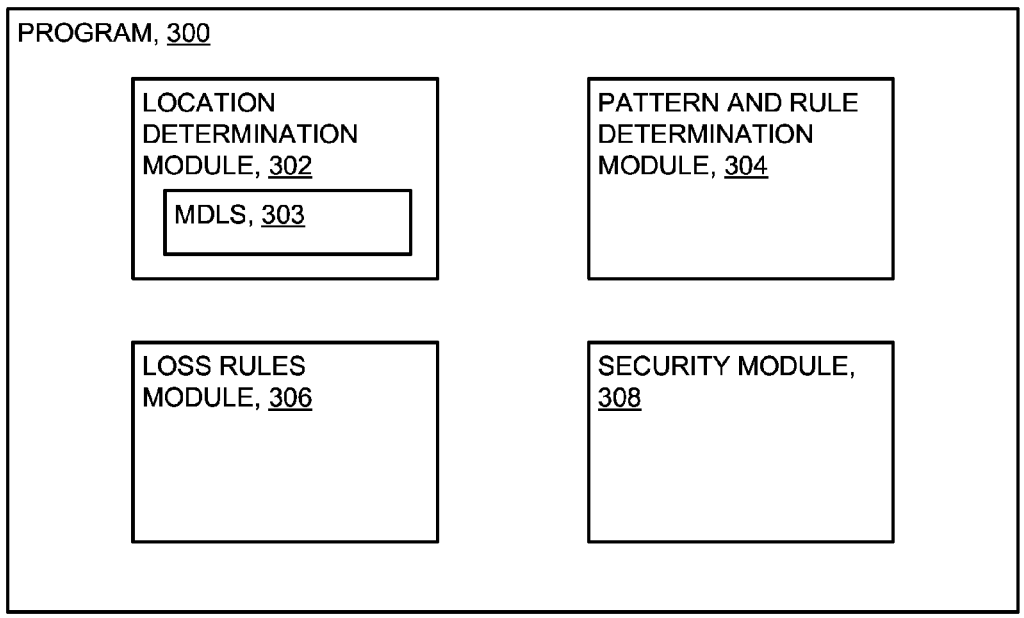
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where location determination module ("mod") 302 monitors the locations of first, second, third and fourth mobile devices 103, 104, 106, 107. In this embodiment, this monitoring is accomplished as follows: (i) each mobile device has a built-in GPS (Global Positioning System) unit (not separately shown in FIG. 1); and (ii) each mobile device has machine logic (not separately shown in FIG. 1) that causes the mobile device to intermittently send its current geographical location to mod 302; and (iii) mod 302 stores the mobile device positions in mobile device location store 303.

In many embodiments of the present invention, the mobile devices of the mobile device set are controlled by a set of individuals and or vehicles that have some real world relationship to each other. In various embodiments of the present disclosure, these real world relationships (if any) of controlling parties of a set of mobile devices may take one, or more, of the following forms: (i) family; (ii) business relationship (for example, mobile devices issued to employees, contractors and/or customers of a business); (iii) friends/social relationship; and/or (iv) monitoring of probationers on a work release program.

In the example under discussion, the four mobile devices of the mobile device set are controlled as follows: (i) first mobile device 103 is the smart phone of the chief executive officer of Company A, who happens to travel extensively on business and/or pleasure; (ii) second mobile device 104 is a smart phone that is always kept at the front desk of Company A's office and is used as the company's general purpose telephone for incoming calls; (iii) third mobile device 106 is a laptop computer that Company A has issued to a field engineer who uses the laptop in the local area in the metropolitan vicinity of Company A's office; and (iv) fourth mobile device 107 is built into the dashboard of Company A's company car, which Company A's insurance policy does not allow to be driven faster than 40 miles per hour. For purposes of the present discussion it should be further understood that, except in exceptional circumstances: (i) the company car is normally parked just outside Company A's office; (ii) the only party that uses the company car is the field engineer who controls third mobile device 107; and (iii) the field engineer only uses the company car on business.

In this embodiment, operation S255 proceeds for a month before initially proceeding to operation S260 so that sufficient geographical location data of the various devices can be collected for meaningful initial pattern determination. However, it should be noted that: (i) location monitoring of operation S255 continues even after the initial instance of operation S260 (for both pattern improvement and loss detection reasons); and (ii) operation S260 is intermittently performed after its initial performance to continuously improve pattern recognition and loss detection accuracy in view of larger and larger amounts of historical location data for each of the mobile devices in the mobile device set.

Processing proceeds to operation S260, where pattern and rule determination module 304 determines patterns and rules based on the location data stored in mobile device location store 303 for mobile device set 103, 104, 106, 107. More specifically, mod 304 looks for meaningful patterns in the locations and movements of: (i) each mobile device considered by itself (herein called "independent device location patterns"); and (ii) each mobile device considered in relation to each of the other mobile devices in the mobile device set (herein called "related device location patterns"). As will be discussed below: (i) independent device location patterns can be used to fashion machine logic applicable independent device loss rules; and (i) related device location patterns can be used to fashion machine logic applicable related device loss rules.

Independent device patterns and associated independent device loss rules will be discussed with reference to two examples. During operation S260, mod 304 determines that second mobile device 104 is never located outside of a small geographic area less than a tenth of a mile in radius. This makes sense because the second mobile device is required to stay in the Company A offices for use as a main telephone for the company office. Therefore, mod 304 makes the following independent device loss rule for the second mobile device: if device 104 is more than a tenth of a mile from global co-ordinates 1023.00, 3677.65, 0010.24, then loss indication condition exists for device 104. As a further example of an independent device loss rule, mod 304 determines that fourth mobile device 107 often travels, but never exceeds 40 miles per hour. Therefore mod 304 sets another independent device loss rule to the effect that if the fourth mobile device is travelling faster than 40 miles per hour then a loss indication condition exists for device 107 (that is, the device built into the company car).

Related device patterns and associated independent device loss rules will be discussed with reference to two examples. During operation S260, mod 304 determines that fourth mobile device 107 (that is, the device built into the company car) is never located outside of a small geographic area less than a tenth of a mile in radius unless the fourth mobile device is in close proximity to third mobile device 106 (that is, the field engineer's laptop). This makes sense because the field engineer is the only person who drives the company car, in normal course of business, and he drives the car only on business, when he would tend to have his laptop with him. Therefore, mod 304 makes the following independent device loss rule for the second mobile device: (i) if the following triggering conditions are met: (a) device 104 is more than a tenth of a mile from global co-ordinates 1028.90, 3663.35, 0010.14, (b) device 106 is currently reporting its location, and (c) device 106 and 107 are more than half a mile apart from each other; then (ii) the following consequence occurs: loss indication condition exists for device 107.

As a further example of a related device loss rule, mod 304 determines that first mobile device 103 (that is, the CEO's smart phone) only travels more than 100 miles away from the company office within 48 hours after a plane ticket has been purchased using second mobile device (that is, the Company A business telephone). Therefore mod 304 sets another related device loss rule to the effect that if the first mobile device is more than 100 miles from the Company A office, and the second mobile device has not purchased a plane ticket in the previous 48 hours, then a loss indication condition exists for device 103. Note that this pattern and rule does not rely on location data from second mobile device 104, but, rather, relies on the substantive nature of data processed using second mobile device 104. In this document, related device loss rules are sometimes referred to as: (i) "related device locational loss rules" if the rules are based, at least in part, on location of the related mobile device(s); and (ii) "related device substantive loss rules" if the rules are based, at least in part, on substantive data processing performed by the related mobile device(s).

Processing proceeds to operation S265, where: (i) location determination module 302 continues to monitor the respective locations of the devices of mobile device set 103, 104, 106, 107 and store the location data in mobile device location store 303; and (ii) loss rules module 306 applies the rules, made by pattern and rule determination module 304 at operation S260, to determine whether a loss indication condition exists with respect to any of the mobile devices 103, 104, 106, 107 based on locational data, and any other data that may be required to be collected from the mobile devices. If a loss condition has been determined to exist by mod 306, then processing proceeds to operation S270.

Processing proceeds to operation S270, where security module 308 makes a responsive action based on detection of any loss condition for any mobile device. Alternatively, in some embodiments, various loss conditions may be accorded respective loss probability scores such that responsive action is only performed when the sum of the scores of existing loss conditions exceed some predetermined threshold. Further discussion of possible specific responsive actions will be set forth, below, in the Further Comments And/Or Embodiments sub-section of this Detailed Description section.

III. Further Comments and/or Embodiments

Some embodiments of the present invention may include one, or more, of the following features, characteristics and/or advantages: (i) does not require a user to play a role in reporting a stolen cell phone; (ii) leverages historical location information associated with one or more device(s) to infer if one of the devices is in an abnormal state and/or has been lost or stolen; (iii) determines if a mobile device is lost and/or stolen based on historical location pattern information for at least one mobile device owned by a particular user; (iv) upon concluding that a device may be lost and/or stolen, the device attempts to validate the conclusion by prompting a person in possession of the device for an appropriate pin or access code, and optionally executes additional user-customizable responses accordingly, to mitigate potential effects adverse to the interests of the owner and/or associates of the owner (for example, persons represented in the owner's contacts list), resulting from loss of the device.

In some embodiments of the present invention, location pattern data is acquired and stored, for a user of one or more mobile devices owned (for example, a cell phone, tablet computer or other mobile device) by the user. The one or more mobile devices sometimes are carried together. Periodically the acquired location pattern data is pulled from the client device and sent to a remote server which can accommodate large data sets. A module running on the device communicates with the remote server. Based on the stored information, the module: (i) determines when an abnormal location situation is trending or has occurred; (ii) predicts or infers from previous historical location data a probability that the client device has been lost and/or stolen; (iii) determines a maximum allowed number of user validation attempts based on the probability that the client device has been lost and/or stolen (greater probability the device has been lost and/or stolen means fewer allowed number of user validation attempts).

In some embodiments of the present invention, if the probability that a client device has been lost and/or stolen exceeds a threshold, the device responses may include: (i) prompting the user with one or more challenges for a validation code such as a personal identification number (pin) or an access code; (ii) inhibiting further use of the device in the event the user fails to successfully respond to the validation prompt within the maximum allowed number of user validation attempts; and/or (iii) resuming normal operation in the event the user successfully responds to the prompt within the maximum allowed number of user validation attempts.

Further, with respect to item (ii) in the paragraph above, in the event that the maximum allowed number of user validation attempts is exceeded, user-customizable options include: (i) the device becomes non-functional; (ii) the device automatically sends an alert (by email, text message or other form of communication) to the owner with details of the occurrence (such as the number of failed user validation attempts, time, date, current location of the phone, image of the person using the device and/or its surroundings, etc.); (iii) the device sends one or more alerts to inform a pre-determined recipient, such as a law enforcement authority, that the device has been stolen; and/or (iv) the device sends a request to register itself in at least one database, the purpose of which is to track stolen devices.

Some embodiments of the present invention may include one, or more, of the following features, characteristics and/or advantages: (i) determines mobile phone theft based on a user's previous location pattern; (ii) determines a probability of being in a lost and/or stolen state; (iii) provides more enhanced security measures by prompting a user to enter an appropriate response to a validation prompt when probability of being in a lost and/or stolen state exceeds a pre-determined threshold; (iv) allows a user to continue using the device when in places outside of the normal location pattern; (v) leverages one or more shared device(s) location pattern(s); (vi) erases confidential content from a mobile device, and/or from data store(s) accessible from the mobile device, thus rendering the data inaccessible from the mobile device, upon determining that the device is lost and/or stolen; (vii) examines a user's location pattern in the past; (viii) combines location patterns from a user's multiple devices and family shared devices; (ix) acquires user's multiple devices, or one or more shared users' mobile devices location pattern(s), recognizing that it is common for family members to share mobile devices, or for a user to own more than one mobile device; (x) takes into consideration multiple shared users' location patterns; (xi) validates a user of a suspected lost and/or stolen device; (xii) protects confidential data on a lost and/or stolen device; and/or (xiii) provides increased intensity of security when theft is suspected; and/or (xiv) leverages multiple user-owned or family account device location patterns to identify mobile device theft.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:

designating a plurality of mobile devices, including a first mobile device and a second mobile device, as a set of related mobile devices for loss indication purposes;

receiving position information relating to the first and second mobile devices;

determining a pattern of relative position over time of the first mobile device with respect to the second mobile device, based at least in part, on the position information;

detecting a deviation between: (i) the pattern of relative position over time of the first mobile device with respect to the second mobile device, and (ii) a current relative position of the first mobile device with respect to the second mobile device;

applying a machine logic based first related device loss rule including a first triggering condition and a first consequence, with: (i) the first triggering condition being based, at least in part, upon detection of the deviation; and (ii) the first consequence being activation of a first loss indication indicating that loss of the first mobile device is at least marginally more likely than it is absent the first loss indication of the first consequence; and responsive to detection of the deviation, presenting, at the second mobile device, the first loss indication.

2. The method of claim 1 further comprising:

monitoring the set of related mobile devices to obtain a related device operational data set including information indicating the activities and/or status of the mobile devices of the set of related mobile device;

activating the first loss indication based on application of the first related device loss rule to the related device operational data set; and on condition that the first loss indication is activated, performing a first responsive action designed to recover and/or mitigate adverse effects due to a likely loss of the first mobile device.

3. The method of claim 2 wherein:

the first triggering condition of the first related device loss rule is based upon relative location(s) of all mobile devices in the set of related mobile devices.

4. The method of claim 2 wherein:

the first triggering condition of the first related device loss rule is based, at least in part, upon location(s) of the first mobile device; and the related device operational data set includes at least location information of the first mobile device.

5. The method of claim 2 wherein the first responsive action includes at least one of the following: (i) issuing one or more validation challenges to a user of the first mobile device; (ii) erasing content from a data store accessible by the first mobile device; (iii) making inaccessible a data store accessible by the first mobile device; (iv) reporting theft of the first mobile device to an owner of the first mobile device; (v) reporting theft of the first mobile device to a law enforcement entity; (vi) making non-functional the first mobile device; (vii) registering the first mobile device in a database of stolen mobile devices; (viii) transmitting information, which can be used to identify a user of the first mobile device, to a recipient; and/or (ix) resuming or continuing normal operation.

6. The method of claim 1 further comprising:

monitoring the related set of mobile devices to obtain a related device operational data set including information indicating the activities and/or status of the mobile devices of the related device set;

detecting a first pattern based upon activities and/or status of at least both of the first and second mobile devices; and wherein the first related device loss rule is made in response to detection of the first pattern.

7. A computer program product comprising a non-transitory computer readable storage medium having stored thereon:

first instructions executable by a device to cause the device to designate a plurality of mobile devices, including a first mobile device and a second mobile device, as a set of related mobile devices for loss indication purposes;

second instructions executable by a device to cause the device to receive position information relating to the first and second mobile devices;

third instructions executable by a device to cause the device to determine a pattern of relative position over time of the first mobile device with respect to the second mobile device, based at least in part, on the position information;

fourth instructions executable by a device to cause the device to detect a deviation between: (i) the pattern of relative position over time of the first mobile device with respect to the second mobile device, and (ii) a current relative position of the first mobile device with respect to the second mobile device;

fifth instructions executable by the device to cause the device to apply a machine logic based first related device loss rule including a first triggering condition and a first consequence, with: (i) the first triggering condition being based, at least in part, upon detection of the deviation; and (ii) the first consequence being activation of a first loss indication indicating that loss of the first mobile device is at least marginally more likely than it is absent the first loss indication of the first consequence; and sixth instructions executable by the device to cause the device, responsive to detection of the deviation, to present, at the second mobile device, the first loss indication.

8. The computer program product of claim 7 wherein the non-transitory computer readable storage medium further has stored thereon:

seventh instructions executable by a device to cause the device to monitor the set of related mobile devices to obtain a related device operational data set including information indicating the activities and/or status of the mobile devices of the set of related mobile devices;

eighth instructions executable by a device to cause the device to activate the first loss indication based on application of the first related device loss rule to the related device operational data set; and ninth instructions executable by a device to cause the device, on condition that the first loss indication is activated, to perform a first responsive action designed to recover and/or mitigate adverse effects due to a likely loss of the first mobile device.

9. The computer program product of claim 8 wherein:

the first triggering condition of the first related device loss rule is based upon relative location(s) of all mobile devices in the set of related mobile devices.

10. The computer program product of claim 8 wherein:
the first triggering condition of the first related device loss rule is based, at least in part, upon location(s) of the first mobile device; and
the related device operational data set includes at least location information of the first mobile device.

11. The computer program product of claim 8 wherein the first responsive action includes at least one of the following: (i) issue one or more validation challenges to a user of the first mobile device; (ii) erase content from a data store accessible by the first mobile device; (iii) make inaccessible a data store accessible by the first mobile device; (iv) report theft of the first mobile device to an owner of the first mobile device; (v) report theft of the first mobile device to a law enforcement entity; (vi) make non-functional the first mobile device; (vii) register the first mobile device in a database of stolen mobile devices; (viii) transmit information, which can be used to identify a user of the first mobile device, to a recipient; and/or (ix) resume or continue normal operation.

12. The computer program product of claim 7 wherein:
the non-transitory computer readable storage medium further has stored thereon:
seventh instructions executable by a device to cause the device to monitor the related set of mobile devices to obtain a related device operational data set including information indicating the activities and/or status of the mobile devices of the related device set; and
eighth instructions executable by a device to cause the device to detect a first pattern based upon activities and/or status of at least both of the first and second mobile devices;
wherein the first related device loss rule is made in response to detection of the first pattern.

13. A computer system comprising:
a processor(s) set; and
a computer readable storage medium;
wherein:
the processor(s) set is structured, located, connected and/or programmed to execute instructions stored on the computer readable storage medium; and
the instructions include:
first instructions executable by a device to cause the device to designate a plurality of mobile devices, including a first mobile device and a second mobile device, as a set of related mobile devices for loss indication purposes;
second instructions executable by a device to cause the device to receive position information relating to the first and second mobile devices;
third instructions executable by a device to cause the device to determine a pattern of relative position over time of the first mobile device with respect to the second mobile device, based at least in part, on the position information;
fourth instructions executable by a device to cause the device to detect a deviation between: (i) the pattern of relative position over time of the first mobile device with respect to the second mobile device, and (ii) a current relative position of the first mobile device with respect to the second mobile device;
fifth instructions executable by the device to cause the device to apply a machine logic based first related device loss rule including a first triggering condition and a first consequence, with: (i) the first triggering condition being based, at least in part, upon detection of the deviation; and (ii) the first consequence being activation of a first loss indication indicating that loss of the first mobile device is at least marginally more likely than it is absent the first loss indication of the first consequence; and
sixth instructions executable by the device to cause the device, responsive to detection of the deviation, to present, at the second mobile device, the first loss indication.

14. The computer system of claim 13 wherein the instructions further include:
seventh instructions executable by a device to cause the device to monitor the set of related mobile devices to obtain a related device operational data set including information indicating the activities and/or status of the mobile devices of the set of related mobile devices;
eighth instructions executable by a device to cause the device to activate the first loss indication based on application of the first related device loss rule to the related device operational data set; and
ninth instructions executable by a device to cause the device, on condition that the first loss indication is activated, to perform a first responsive action designed to recover and/or mitigate adverse effects due to a likely loss of the first mobile device.

15. The computer system of claim 14 wherein:
the first triggering condition of the first related device loss rule is based upon relative location(s) of all mobile devices in the set of related mobile devices.

16. The computer system of claim 14 wherein:
the first triggering condition of the first related device loss rule is based, at least in part, upon location(s) of the first mobile device; and
the related device operational data set includes at least location information of the first mobile device.

17. The computer system of claim 14 wherein the first responsive action includes at least one of the following: (i) issue one or more validation challenges to a user of the first mobile device; (ii) erase content from a data store accessible by the first mobile device; (iii) make inaccessible a data store accessible by the first mobile device; (iv) report theft of the first mobile device to an owner of the first mobile device; (v) report theft of the first mobile device to a law enforcement entity; (vi) make non-functional the first mobile device; (vii) register the first mobile device in a database of stolen mobile devices; (viii) transmit information, which can be used to identify a user of the first mobile device, to a recipient; and/or (ix) resume or continue normal operation.

18. The computer system of claim 13 wherein:
the instructions further include:
seventh instructions executable by a device to cause the device to monitor the related set of mobile devices to obtain a related device operational data set including information indicating the activities and/or status of the mobile devices of the related device set; and
eighth instructions executable by a device to cause the device to detect a first pattern based upon activities and/or status of at least both of the first and second mobile devices; and
the first related device loss rule is made in response to detection of the first pattern.

\* \* \* \* \*